United States Patent [19]

Khanna et al.

[11] Patent Number: 4,749,736

[45] Date of Patent: Jun. 7, 1988

[54] NUCLEATING SYSTEM FOR POLYAMIDES

[75] Inventors: Yash P. Khanna, Cedar Knolls; Georgette Chomyn, Randolph; Asis Banerjie, Whippany; Annemarie C. Reimschuessel, Morristown, all of N.J.

[73] Assignee: Allied Corporation, Morris Township, Morris County, N.J.

[21] Appl. No.: 920,627

[22] Filed: Oct. 20, 1986

[51] Int. Cl.$^4$ .......................... C08K 5/20; C08K 3/34
[52] U.S. Cl. .................................. 524/230; 524/232; 524/606; 524/447; 524/449; 524/451
[58] Field of Search ....................... 524/230, 232, 606

[56] References Cited

U.S. PATENT DOCUMENTS 3,549,651 12/1970 Oswald et al. ..................... 524/606
3,755,221 8/1973 Hitch .................................. 524/606

*Primary Examiner*—Lewis T. Jacobs
*Attorney, Agent, or Firm*—Richard C. Stewart; Gerhard H. Fuchs

[57] ABSTRACT

This invention relates to a crystalline polyamide corporation having dispersed therein a nucleating agent composed of one or more finely divided inorganic materials, one or more fatty acid amides and one or more low molecular weight polymers selected from the group consisting of polyolefins, polyoxides and polsulfides.

35 Claims, 4 Drawing Sheets

NUCLEATING SYSTEM FOR POLYAMIDES

BACKGROUND OF THE INVENTION (1) Field of the Invention

This invention relates to a nucleating system for promoting the crystallization rate of synthetic linear polyamides on cooling such polymers from the molten state, and to polyamides containing said system. Another aspect of this invention relates to polyamides which contain the nucleating system of this invention.

(2) Prior Art

X-ray diffraction studies of synthetic linear polyamides such as nylon 6 have shown that they may exist in one or more of several different crystalline forms. Structures which have been recognized include, in the case of nylon 6, the amorphous form, the pseudo hexagonal gamma-form, and the monoclinic alpha form.

The amorphous form of nylon 6 is obtained by rapid quenching of molten polymer to a temperature below the glass transition temperature of the nylon. Both the amorphous and gamma-forms are relatively unstable upon application of heat and moisture. Heating amorphous material to a temperature between approximately 55° C. and 150° C. results in at least a partial conversion of the amorphous form into the gamma-form. At temperatures above 150° C., a transition of the gamma- into the alpha-form occurs. This monoclinic alpha structure represents a highly ordered crystalline form that is stable at temperatures up to the melting point of the nylon 6. It is the most desirable crystalline form from the standpoint of obtaining the optimum physical properties with nylon 6, including mold shrinkage and maximum dimensional stability.

The "super" or morphological structure in which the crystalline units are arranged also affects the physical properties of nylons. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture or graininess in the bulk of the material and influences optical as well as physical properties. Physical properties improve with increasing homogeneity and fineness of the spherulitic structure throughout the bulk of the material.

To obtain optimum physical properties in articles fabricated from nylon 6, it is desirable, therefore, to produce a highly crystalline material, crystallized predominantly in the stable alpha-form, with an extremely fine, dense and uniform morphological structure.

Among the physical properties affected by increased crystallinity and improved morphological structure are abrasion resistance, heat distortion temperature, inherent stability or resistance to deformation, resistance to hot water, coefficient of expansion, hardness, tensile yield strength and surface hardness.

Customary fabricating procedures used with nylon 6 such as injection molding, which include a rapid cooling from the melt, generally result in articles which contain the different crystalline structural forms to a varying degree depending upon the thermal history of the article.

It is known that a greater degree of crystallinity is obtained when polyamides are cooled extremely slowly from the melt; however, under these conditions, large spherulites develop, moreover the process is not economical. Crystallinity and the uniformity of the morphological structure can also be increased by annealing treatments after solidification. However, such practices are not economically feasible in ordinary industrial fabricating procedures as, for example, injection molding. More recently, investigators have found that bodies shaped from polyamides having a homogeneous and fine spherulitic structure can be obtained by addition to the polyamide melt of finely divided solids which act as crystallization nuclei. (e.g. U.S. Pat. Nos. 2,855,377, 3,261,800 and 3,080,345; Belgian patent No. 674,170; Japanese patent Nos. 52-105958 and 80-041623, U.S. Pat. No. 4,501,844; Gurato, G. et al "Influence of Nucleating Agents on the Crystallization of Nylon 6", Makromol. Chem., Vol. 179(1), pp. 231 to 245 (1978); Chatterjee, A. M., et al., "Heterogeneous Nucleation of Crystallization of High Polymers From the Melt", J. Polym. Sci., Polym. Phys. Ed., Vol. 13(12), pp. 2368-83 (1975); and Koutsky, J. A., "Nucleation of Polymer Droplets", J. Appl. Phys., Vol. 38(4), pp. 1832-39 (1967).

The function of nucleating agents when cooling semicrystalline polymers from the molten into the solid form is to increase the number of nuclei formed in a given time interval at a predetermined temperature. The final and over-all crystallinity, however, depends not only on the number of nuclei that are formed but also on the spherulitic growth rate from such nuclei. As noted above, spherulites develop with respect to a center, or nucleus, of growth. Addition of the nucleating agents thus provides a large number of sites for growth upon cooling from a melt. In order to be of practical use, such nucleating agents not only must produce a fine spherulitic structure but also must do this under conditions of rapid cooling to a temperature above the glass transition temperature of the polyamide, i.e., they must reduce the time that is necessary under a given set of conditions for crystallization to start. This time is usually referred to as "induction time". Subsequent growth from the spherulitic center depends on the polymer chain mobility. Thus, a factor in the spherulitic growth rate is the macroscopic viscosity of the polymer and its temperature dependence. All segmental motion is "frozen in" at the glass transition temperature (Tg) and no additional crystallization occurs even when nuclei are present. This Tg is about 50° C. in nylon 6.

Other prior art describes other additives which can be used in addition to nucleating agents to enhance their effectiveness. For example, U.S. Pat. No. 3,549,651 discloses that the effectiveness of nucleating agents for linear polyamides in terms of the rate of crystallization into the desirable crystalline form can be increased by using a plasticizer in conjunction with the nucleating agent. U.S. Pat. No. 4,200,707 discloses the use of zinc phenyl phosphinate and zinc phenyl phosphonate as nucleating agents for certain polyamides, and U.S. Pat. No. 3,867,339 describes polyamides containing sodium phenyl phosphinate and a calcium salt. U.S. Pat. No. 4,397,979 discloses that materials such as lithium metasilicate, lithium aluminate, lithium metaphosphate, lithium fluoride, magnesium fluoride, zirconium tetrafluoride, zirconium silicate and mixtures thereof. Great Britain patent No. 1,211,689 and German patent No. 1,694,476 disclose that substances such as calcium fluoride, molybdenum disulfide, lead tungstate, antimony trioxide, graphite, talcum and asbestos are effective nucleating agents. U.S. Pat. No. 4,159,286 discloses the use of poly tetrafluoroethylene and at least one water insoluble organic salt or inorganic salt or oxide as the nucleating agent. U.S. Pat. No. 3,645,932 describes a process of developing rapidly the crystalline characteristics of certain polyamides by incorporation of a variety of nylon and other polyamide resins, polyethylene, polypropylene, polycarbonate and polyethylene acrylic acid copolymer ionomers. U.S. Pat. Nos. 4,536,533 and 4,501,844 disclose a rapidly crystallizable composition comprising (a) a linear polyamide selected from the series poly(4,4'-methylenediphenylene azelamide to dodecanediamide); and (b) an amount sufficient to promote the crystallization of the linear polyamide, of a material selected from the group of (I) talc, (II) sodium benzenesulfonate, (III) a polyethylene ionomer, (IV) a methoacrylated butadiene-styrene, and (V) a multi-phase composite interpolymer. The compositions crystallize rapidly from the molten state which allows for economically attractive molding procedures including fiber production and the production of aromatic-aliphatic polyamides having a combination of excellent porperties.

U.S. Pat. No. 3,400,087 discloses that the rate of crystal growth without substantial increase in the percent of total crystallization of polyamides is obtained by incorporating in the melt finely divided calcite particles and a fatty alcohol. DD Appln. No. 103,456 describes the use of nucleating agents for polyamides, especially tannin. Japanese patent No. 73 017552 discloses a composition comprising a polyamide, (e.g. nylon 6, 11, 12, 66, 610, etc.) and 0.01-3 wt. % of a compound selected from As-oxide, Sb-oxide and Bi-oxide, talc and clay, and 0.01-3 wt. % of either a polyvalent alcohol (e.g. trimethylolethane, trimethylolpropane, erythritol, sorbitol, mannitol, etc.), or an aromatic ketone (e.g. benzophenone, phenyl benzyl ketone, dibenzoyl, benzoyl methane, etc.).

U.S. Pat. No. 3,645,932 discloses nucleating agents selected from: (a) polymers and copolymers of mono-olefins, having from 2 to 6 carbon atoms the ionomer of ethyleneacrylic acid copolymer; (b) a polyamide of (1) epsilon-caprolactam, (2) omega-amino undecanoic acid, (3) omega-aminododecanoic acid, (4) hexamethylene diamine and adipic acid, (5) hexamethylene diamine and sebasic acid, or a copolyamide resin derived from polymeric fatty acids, sebasic acid and bsiamino-ethylbenzene, (c) polycarbonate of p,pl-isopropyliodenediphenol and phosgene; (d) polystyrene terpolymers of acrylonitrile, butadiene and styrene; (e) natural rubber, balata; and (f) paraffin wax, microcrystalline wax, are dispersed in an amount of 0.1-10 wt. % in a crystalline polyamide derived from hydrogenated polymeric fatty acid, a coacid having from 6 to 10 carbon atoms and a diamine, and 25-75 wt.% of the polyamide derived from the reaction product of the coacid and diamine.

U.S. Pat. No. 3,549,651 describes a solid synthetic linear polyamide composition having enhanced crystalline uniformity, the polyamide having dispersed in it about 0.10-5.0 weight percent of a finely divided nucleating agent selected from a group consisting of sodium phenyl phosphinate, sodium isobutyl phosphinate, silver bromide, molybdenum disulphide, boron nitride, the sodium complex of phthalocyanine and talcum, and from about 0.25-20 weight percent of a plasticizing agent selected from the group consisting of triethylene glycol, 2-ethyl-1,3 hexane-diol, tricresylphosphate, N-ethyl ortho- and para-toluene sulfonamide, and a mixture of N-ethyl and p-toluene sulfonamide.

U.S. Pat. No. 4,518,731 discloses that an adduct of aryl carboxylic or sulphonic acid and crystalline zeolite functions as a nucleating agent for crystalline polymers.

U.S. Pat. No. 3,367,926 describes a nucleating agent for crystalline copolymers selected from polyalpha-olefins, thermoplastic polyesters, and polyamides, which comprises an adduct obtained by interaction of (a) an aryl-carboxylic acid or sulphonic acid chosen from those which in the form of metal salts are known to exert a nucleating effect on the crystalline polymers of alpha olefins, the acid having a melting point greater than the crystallization temperature of the polymer and being thermally stable at the maximum operational temperature in processing of the polymeric material, and (b) a crystalline aluminium silicate of an alkaline or alkaline earth metal of the zeolitic tectosilicate type, having a pore diameter of 3A-13A and a molar ratio $SiO_2/Al_2O_3 = 2-5$, in powder form, under such conditions that allow chemi-adsorption of the acid (a) in component (b), such that 1-25g (a) is present per 100 g (b) and (a) is partly bound to (b) by chemical bonds of polar type.

DD patent No. 151,317 describes the fact that polymerization of alpha-crystalline Epsilon-polycaprolactam shaped objects stabilised by additives involves the addition by weight of 0.01–0.2% $CuCl_2$, 0.02–0.5% KBr, 0.2–2.0% melamine, 0.01–0.5 (0.05–0.2)% talcum and 0.1–2.0% of a metal salt of a 12–20C. monocarboxylic acid (preferably 0.2–1.0 wt. % calcium or zinc stearate) to the caprolactam, as well as any pigments, fillers or reinforcing agents that may be required. The additives serve to stabilize the product.

SUMMARY OF THE INVENTION

In accordance with this invention, there is provided a synthetic linear polyamide composition containing a unique nucleating agent which provides for a relatively homogenous and fine spherulitic or crystal structure dispersed in said composition as compared in the homogeneity and fineness of such structures in compositions containing other nucleating agents. More particularly, the composition of this invention comprises:

one or more linear polyamides; and an effective nucleating agent comprising a combination of:
(a) one or more low molecular polymers selected from the group consisting of polyolefins, polyoxides and polysulfides;
(b) one or more fatty acid amides; and
(c) one or more finely divided inorganic materials.

Another aspect of this invention relates to the effective nucleating agent of this invention for enhancing the rate of crystallization of polyamides, said agent comprising:
(a) one or more low molecular polymer selected from the group consisting of polyolefins, polyoxides and polysulfides;
(b) one or more fatty acid amide; and
(c) one or more finely divided inorganic material.

Yet another aspect of this invention relates to a novel process for enhancing the rate of crystallization of a polyamide from the melt, which process comprises adding to said polyamide a crystallization enhancing effective amount of the nucleating agent of this invention.

Several advantages flow from this invention. For example, by speeding up the rate of crystallization, processing times are decreased. Moreover, the polyamides formed in accordance with this invention are characterized by relatively homogeneous and fine spherulitic structures which have improved optical clarity and as a result have enhanced utility in applications where such clarity is required. Furthermore, the polyamide compositions of this invention exhibit improved physical properties.

DESCRIPTION OF THE PREFERRED EMBODIMENTS

Figure 1:
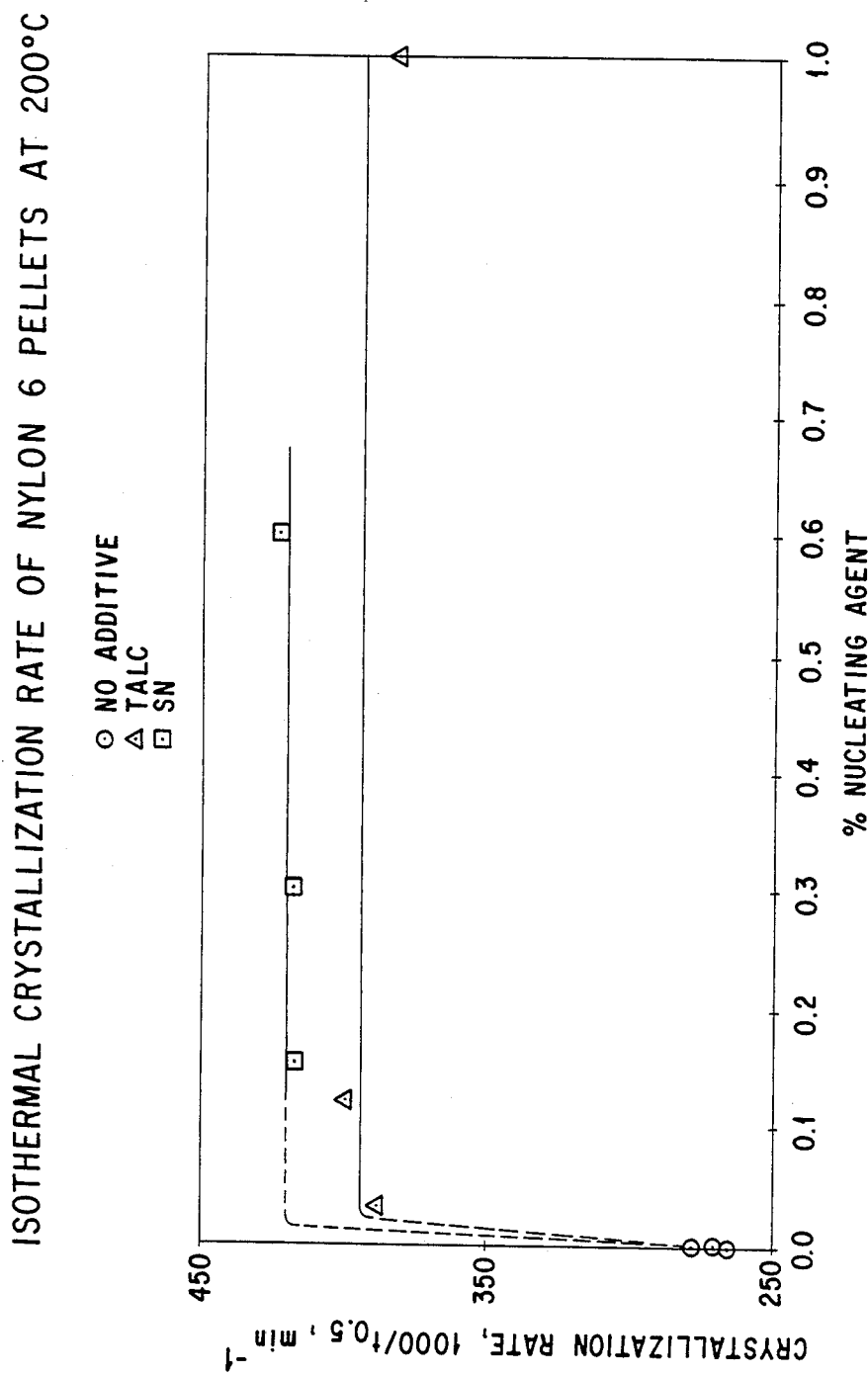
FIG. 1 is a plot of the rate of cyrstallization of nylon 6 compositions as a function of the % of nucleating agent added to the nylon.

As an essential ingredient, the composition of this invention comprises one or more polyamides. The type of polyamides employed in the practice of this invention can vary widely. Illustrative of polyamides useful in the conduct of this invention are those which are produced by polymerizing monoamino monocarboxylic acids, or lactams thereof, or a mixture of a diamine and a dicarboxylic acid optionally together with a monoamino-monocarboxylic acid. Illustrative of such lactams and monocarboxylic acids are e-amino caproic acid, caprolactam, 4-aminobutyric acid, 6-aminohexanoic acid, 7-aminoheptanoic acid, 8-aminooctanoic acid, 10-aminodecanoic acid, 12-aminododecanoic acid, 9-aminononanoic acid, 11-aminoundecanoic acid, 17-aminoheptadecanoic acid, capryllactam, enanthiolactam and the like. Preferred damines are of the general formula $H_2N(CH_2)_mNH_2$ wherein m is an integer of from about 2 to about 12, such as trimethylene diamine, octamethylene diamine, nonamethylene diamine, decamethylene diamine, metaphenylene diamine, tetramethylene diamine, pentamethylene diamine, hexamethylene diamine and the like. Preferred dicarboxylic acids are of the formula HOOC-Y-COOH, wherein Y is a divalent aliphatic radical containing at least 1 carbon atom, as for example, sebacic acid, octadecanoic acid, suberic acid, azelaic acid, undecanoic acid, glutaric acid, pimelic acid, adipic acid and the like or is an aromatic moiety as for example terephthalic acid, isophthalic acid and the like.

Preferred polyamides are nylon 6 (a polymer of caprolactam); nylon 66 (a polymer of hexamethylene diamine and adipic acid); nylon 610 (a polymer of hexamethylene diamine and sebacic acid); nylon 11 (a polymer of 12-amino undecanoic acid); and nylon 12 (a polymer of dodecyl lactam). Amongst these preferred polyamides, nylon 6 and nylon 66 are particularly preferred, and nylon 6 is most preferred.

As a second essential component the composition of this invention will include an "effective amount" of an "effective nucleating agent". Effective nucleating agents employed in the practice of this invention comprise a mixture of one or more low molecular weight polymers selected from the group consisting of polyolefin, polyoxides and polysulfides, one or more fatty acid amides and one or more finely divided inorganic materials. Illustrative of useful polymers are polyolefins such as polyethylene, polypropylene, poly(styrene), polyisobutylene, poly(1-butene), poly(3-methyl-1-butene), poly(1-pentene), poly(4-methyl-1-pentene), poly(1-hexene), poly(5-methyl-1-hexene), poly(1-octadecene), poly(2-methylstyrene), poly(4-methoxy styrene) and the like; polyoxides such as poly (ethylene oxide), poly(tetramethylene oxide), poly (propylene oxide), poly(hexene oxide), poly(butoxy propylene oxide), poly(octene oxide), poly(styrene oxide); and polysulphides such as poly(propropylene sulfide), poly(phenylene sulfide) and the like. Preferred for use in the practice of this invention are polyolefins and polyalkyleneoxides wherein the recurring unit comprises from about 2 to about 5 carbon atoms, and particularly preferred for use in the practice of this invention are polyolefins wherein the recurring unit comprises from about 2 to about 4 carbon atoms. Amongst the particularly preferred embodiments, most preferred are those embodiments in which the polymer is poly(ethylene), poly(propylene), poly(ethylene oxide), poly(propylene oxide) and poly(isohutylene), with poly(ethylene) and poly(propylene) being the polymers of choice.

The molecular weight of the additive polymer is critical, and generally the additive polymer is of "wax forming molecular weight". As used herein, a "wax forming molecular weight" is a molecular weight such that the polymer has the characteristics of a wax. Such a molecular weight is well known in the art and will not be described herein in any great detail. When preferred poly(ethylene) is employed as the polymer component, the polymer is a solid preferably copolymerized with from about 1 to about 10 mole percent vinyl acetate, and has a viscosity (at 140° C., Brookfield) of from about 200 to about 600 cps. In the preferred embodiments, the polymer is a solid and has a viscosity of from about 250 to about 550 cps as determined above, and in the particularly preferred embodiments the polymer is a solid and has a viscosity of from about 250 to about 450. Amongst the particularly preferred embodiments, most preferred are those embodiments in which the polymer is a solid and has a viscosity (at 140° C., Brookfield) of from about 300 to about 450 cps, with a polymer having a viscosity of from about 350 to about 400 cps as determined above usually being the additive polymer of choice.

Fatty acid amides for use in the practice of this invention can vary widely. Illustrative of useful fatty acid amides are caproamide, caprylamide, capramide, lauramide, myristamide, palmitamide, oleoamide, linoleamide, linolenamide, valeramide, stearamide and the like. Preferred fatty acid amides are those having at least about 10 carbon atoms, and particularly preferred for use in the practice of this invention are those having at least about 11 carbon atoms. Most preferred fatty acid amides are lauramide, myristamide, palmitamide, stearamide, oleamide, linoleamide and linolenamide, with oleamide usually being the fatty acid polyamide of choice.

Useful finely divided inorganic materials may vary widely and can be any such material which is known for use in a crystalline polymer as a nucleating agent. Illustrative of such materials are talc, mica, kaolin abestos, alumina, silica, silver bromide, graphite, molybdenum disulfide, lithium fluoride, sodium phenylphosphinate, sodium isobutylphosphinate, magnesium oxide, mecuric bromide, mercuric chloride, cadmium acetate, lead acetate, silver chloride, kieselguhr and the like. Preferred for use in the practice of this invention are talc, mica, kaolin, kieselguhr and asbestos. Particularly preferred finely divided inorganic materials are talc, mica, and kaolin. Amongst these particularly preferred embodiments most preferred are those embodiments in which talc is the finely divided inorganic material.

As noted, the inorganic material is in the form of finely divided particles and can be of any size normally used for nucleating agents. The size of each particle is well known in the art and will not be described herein in any great detail.

The ratio of the various components in the nucleating agent may vary widely, however, the finely divided inorganic material is usually in the major amount. In general, the nucleating agent comprises from about 50 to about 90 weight percent of one or more finely divided inorganic material, from about 2 to about 15 weight percent of one or more fatty acid amides and from about 5 to about 35 weight percent of one or more low molecular weight polymers based on the total weight of the three components of the agent. In the preferred embodiments of the invention, the nucleating agent contains from about 50 to about 80 weight percent of one or more finely divided inorganic material, from about 3 to about 12 weight percent of one or more fatty acid amides, and from about 15 to about 30 weight percent of one or more low molecular weight polymers based on the total weight of the three components; and in the particularly preferred embodiments, the amount of inorganic materials is from about 65 to about 75 weight percent, the amount of fatty acid amides is from about 4 to about 10 weight percent, and the amount of low molecular weight polymers is from about 20 to about 30 weight percent on the aforementioned basis. Amongst these particularly preferred embodiments, most preferred are those embodiments in which the amount of one or more finely divided inorganic materials is about 68 to about 72 weight percent, the amount of one or more fatty acid amides is about 4 to about 8 weight percent, and the amount of one or more low molecular weight polymers is about 23 to about 27 weight percent, based on the total weight of the three components.

The amount of mucleating agent added to the polyamide is an "effective amount". As used herein, an "effective amount" is an amount which is sufficient to improve the homogeniety and/or fineness of spherulitic structures in the polyamide to any extent. Such amounts will normally correspond to amounts of conventional nucleating agents. In the preferred embodiments of the invention, the amount of nucleating agent employed is in the range of from about 0.15 to about 1 weight percent based on the total weight of polyamide and agent, and in the particularly preferred embodiments of the invention is from ahout 0.2 to about 0.6 weight percent on the aforementioned basis. Amongst these particularly preferred embodiments, most preferred are those embodiments where the amount of nucleation agent employed is from about 0.25 to about 0.4 weight percent based on the total weight of agent and polyamide.

In addition to the above-described essential components, the molding composition of this invention can include various optional components which are additives commonly employed with polyester and polyamide resins. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, accordingly, only the preferred optional components will the described herein in detail.

The molding composition of this invention preferably includes a fibrous or particulate filler, which functions to increase the modulus and stiffness of the composition, and provides a more economical composition. Any conventional fibrous or particulate filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may he selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like. Such fillers are well known materials and are readily available. The foregoing recited fillers are illustrative only and are not meant to limit the scope of the fillers that can be employed in this invention. In the preferred embodiments of this invention, fibrous materials such as giber glass, carbon fibers, boron fibers and polymer fibers are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer component, and in the particularly preferred embodiment is in the range of from about 30 to about 90 weight percent on the same basis.

While not essential, it may be desirable to include an optional plasticizer in the composition of this invention. The plasticizer allows crystallization of the amorphous areas of the composition to continue at lower temperatures than if a plasticizer is not used. This is particularly important in low temperature molding. The plasticizers which can be used with the composition of the present invention are of the type known in the art as useful in linear polyamide molding compositions. Preferred plasticizers are those which are useful with polycaprolactam. Such useful plasticizer compositions are well known in the art and accordingly will not be described herein in detail.

The molding composition of this invention can be further modified by the addition of one or more pigments. Illustrative of useful pigments are iron oxide, cadmium red, rhodamine, chrome yellow, chrome green, and phthalocyanine blue.

The molding composition of this invention can be repared by blinding or mixing the essential ingredients, and other optional components, as uniformly as possible employing any conventional blending means. Appropriate blending means, such as melt extrusion, batch melting and the like, are well known in the art and will not be described herein in greater detail. In one useful procedure, the blending procedure can be carried out at elevated temperatures above the melting point of the polymer and the nucleating agent either preformed, or as individual components of the agent separately or as a combination of the components in a suitable form as for example, granules, pellets and preferahly powders is added to the melt with vigorous stirring. Alternatively, all or a portion of the various components of the nucleating agent can be masterbatched or preblended with the polyamide in the melt and this premixed or masterbatch added to the polyamide in the melt in amounts sufficient to provide the desired amount of nucleating agent in the polyamide product. Stirring is continued until a homogeneous composition is formed. The nucleating agent can also be added to the melt coated on the surface of small particle inert powders which have a high surface volume ratios. The use of such inert powders, as for example, fused silica, fused alumina, carbon black and aerogels, and hydrogels of silica or alumina, helps to reduce the amount of nucleating agent required to provide optimum results. Accordingly, such powders will be employed in the conduct of the preferred embodiments of this invention. Blending temperatures and blending pressures, and the order of addition of the various components are not critical and may be varied as desired provided that a substantially homogeneous composition results. The blending procedure can be carried out at elevated temperatures, in which case the polymer component is melted and the solid nucleating agent is admixed therewith by vigorously stirring the melt. Similarly, the various solid components can be granulated, and the granulated components mixed dry in a suitable blender, or for example, a Banbury mixer, as uniformly as possible, then melted in an extruder and extruded with cooling.

Alternatively, the composition of this invention can be formulated by dissolving the components in an appropriate inert solvent, after which the solvent is removed by evaporation, or other conventional solvent removing means are employed to provide the composition. The solvent is not critical, the only requirement being that it is inert to the components of the composition, and it is capable of solubilizing the various components, or at least forming dispersions thereof.

The molding compositions according to the invention can be partially crystalline to amorphous, depending on which individual constituents are employed. They are thermoplastic materials from which molded articles of manufacture having valuable properties can be produced by the conventional shaping processes, such as melt spinning, casting, injection molding and extruding. Examples of such moldings are components for technical equipment, apparatus castings, household equipment, sports equipment, components for the electrical and electronics industries and electrical insulations, car components, circuits, fibers, and semi-finished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The molding compositions according to the invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example, based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films. The compositions of this invention are especially useful for fabrication of extruded films, as for example films for use in food packaging. Such films can be fabricated using conventional film extrusion techniques.

The following specific examples are presented to more particularly illustrate the invention, and should not be construed as being limitations on the scope and spirit of the invention.

EXAMPLE I

In this Example, commercial poly (caprolactam) (Nylon 6) trade designation Capron ® grade 8207F obtained from Allied Corporation having a $M_w$ of about $37 \times 10^3$, commercial grade polyethylene wax having the trade designation AC ®-403 obtained from Allied Corporation having a Brookfield viscosity (at 140° C.) of about 400 cps, commercial grade talc having the trade designation Micropflex MP1250 obtained from Pfizer, Inc., and commercial grade oleamide obtained from Akzo Chemie, America, Inc. were used.

In these experiments, the various components of the nucleating agent and the poly(caprolactam) were master-batched by tumble blending the ingredients, and feeding the tumbled ingredients into the throat of a twin screw extruder (marketed by Leistritz Corp.) or a single screw extruder (marketed by Egan). For a twin screw extruder (lab size 30 mm diameters) the temperature profiles are as follows: throat cold, −250° C., −260° C., −260° C., −260° C., −200° C., −250° C., −260° C., −Die. The extruder was operated at 40 revolutions per minute and at a rate of 17 lbs. per hour. The masterbatched composition is set forth in the following Table I.

TABLE I

| Component | Weight Percent |
| --- | --- |
| (a) Talc (Micropflex MP1250) | 6.0 |
| (b) Polyethylene Wax (AC-403) | 2.0 |
| (c) Oleamide | 0.5 |
| (d) Nylon 6 | 91.5 |

Various amounts of the masterbatched composition were then co-extruded with various amounts of nylon 6 in a twin screw extruder to form the following compositions set forth in the following Table II.

TABLE II

| Components | Composition (% by Wt) | | |
| --- | --- | --- | --- |
| | A | B | C |
| (a) Nylon 6 | 99.83 | 99.66 | 99.32 |

TABLE II-continued

| Components | Composition (% by Wt) | | |
|---|---|---|---|
| | A | B | C |
| (b) Talc (Micropflex MP-1250) | 0.12 | 0.24 | 0.48 |
| (c) Polyethylene (AC-403) | 0.04 | 0.08 | 0.16 |
| (d) Oleamide | 0.01 | 0.02 | 0.04 |

These nucleated nylon blends A, B and C can be extruded into films having exceptionally superior crystallization characteristics as determined by differential scanning calorimetry (DSC) experiments.

COMPARATIVE EXAMPLE I

A series of experiments were carried out to show the superior crystallization characteristics of the composition of this invention as compared to other nucleated polyamide compositions and un-nucleated polyamide compositions as determined by differential scanning colorimetry (DSC) experiments.

The DSC experiments were carried out using a DuPont 9900 automated system, in an argon atmosphere. A sample of 10.0±0.2 mg was crimped in an aluminum cup, heated to 280° C. at a program rate of 10° C./min, held there for 5 min. and then cooled at 10° C./min. to obtain the $T_{cc}$ (the crystallization temperature). For isothermal crystallization, the sample after 280° C./5 min. treatment was cooled to 200° C. and crystallized isothermally. The peak width at half-height ($T_{0.5}$ min) was evaluated for the isothermal DSC peak; its reciprocal e.g. $1000/T_{0.5}$ is indicative of the overall crystallization rate. The results of these experiments are set forth in the following Table III. The procedure employed to evaluate the compositions are as set forth in preceding EXAMPLE I. The results of the evaluation are set forth in the following Table III.

TABLE III

| Composition | Wgt % Nucleating Agent | Wgt % Nylon | Isothermal Crystallization @ 200° C. Rate = $1000/T_{0.5}$, min$^{-1}$ |
|---|---|---|---|
| 1 | None | 100% | 267 |
| | | | 277 |
| | | | 267 |
| 2 | 0.03% Talc | 99.7% | 389 |
| 3 | 0.12% Talc | 99.88% | 400 |
| 4 | 1.0% Talc | 99% | 382 |
| 5 | 0.15% SN* | 99.85% | 417 |
| 6 | 0.30% SN* | 99.7% | 427 |
| 7 | 0.60% SN* | 99.4% | 424 |

*"SN" is the nucleating agent of this invention which contains 70.6% by weight micropflex talc, 23.5% by weight A-C © 403 polyethylene wax and 5.9% by weight oleamide.

As shown in Table III and FIG. I the nucleating agent of this invention exhibits significant improvement in the rate of crystallization of nylon 6 as compared to the conventional nucleating agent talc and the unnucleated nylon 6 composition.

COMPARATIVE EXAMPLE II

Micrographs of compositions 1, 2, 4, 5 and 7 of Table III were taken. The procedure employed was as follows: Sections were microtomed, mounted on microscope slides and examined with a Leitz Ortholux microscope in transmitted polarized light between polarizer and analyzer. Photomicrographs of the sections were prepared at a linear magnification of 630.

Figure 2:
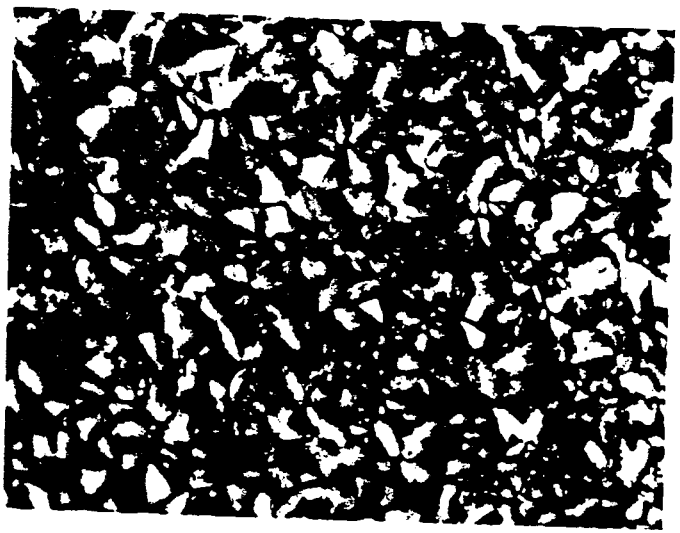
FIG. 2 is an optical photomicrograph of nylon 6 pellets which do not contain a nucleating agent crystallized in differential scanning calorimeter at 200° C.
Figure 3:
FIG. 3 is an optical photomicrograph of nylon 6 pellets which contain 0.03% by weight talc as a nucleating agent crystallized in differential scanning calorimeter at 200° C.
Figure 4:
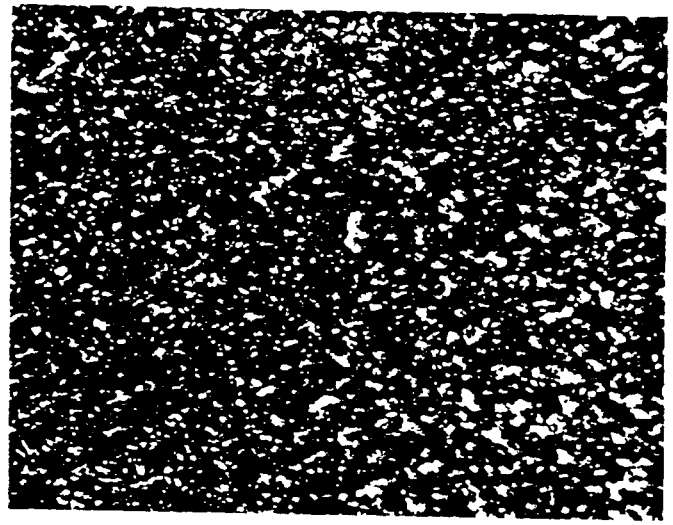
FIG. 4 is an optical photomicrograph of nylon 6 pellets which contain 0.15% by weight of the nucleating agent "SN" of Table V crystallized in differential scanning calorimeter at 200° C.
Figure 5:
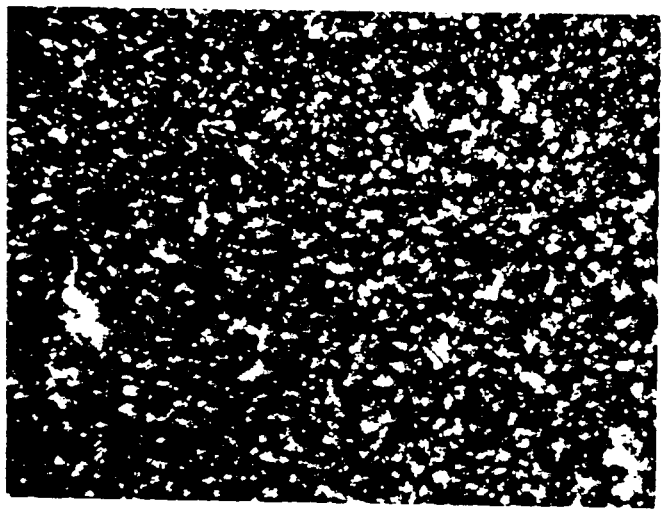
FIG. 5 is an optical photomicrograph of nylon 6 pellets which contain 1.0% by weight talc as a nucleating agent crystallized in differential scanning calorimeter at 200° C.
Figure 6:
FIG. 6 is an optical photomicrograph of nylon 6 pellets which contain 0.6% by weight of the nucleating agent "SN" of Table V crystallized in differential scanning calorimeter at 200° C.

The results of these experiments are set forth in FIGS. 2 to 6. The figures show strong morphological differences among the non-nucleated and nucleated samples which were crystallized in the DSC at 200° C. The non-nucleated sample exhibits a well-developed spherulitic superstructure, whereas the nucleated samples reveal interconnected texture associated with nucleation. Comparing the talc and "SN" nucleated samples, it appears that SN results in a more interconnected morphology and finer grain size. This is again indicative of a more effective nucleating agent and is consistent with the DSC data set forth in Table III above.

The foregoing detailed description of the invention has been given for clearness of understanding only, and no necessary limitations are to be inferred therefrom. The invention is not limited in the exact details herein shown and described, and will encompass obvious modifications which will occur to those of skill in the art in light of the appended claims.

What is claimed is:

1. A composition comprising:
a polyamide having dispersed therein a nucleating effective amount of a nucleating agent comprising:
   (a) one or more finely divided inorganic materials;
   (b) one or more fatty acid amides; and
   (c) one or more additive polymer of wax forming molecular weight selected from the group consisting of polyolefins, polyoxides and polysulfides; wherein the amount of said additive polymers is from about 5 to about 35 weight percent based on the total weight of the agent.

2. A composition according to claim 1 wherein said polyamide is selected from the group consisting of nylon 6, nylon 66, nylon 610, nylon 11 and nylon 12.

3. A composition according to claim 2 wherein said polyamide is selected from the group consisting of nylon 6, and nylon 66.

4. A composition according to claim 3 wherein said polyamide is nylon 6.

5. A composition according to claim 1 wherein said low molecular polymers are selected from the group consisting of polyolefins.

6. A composition according to claim 5 wherein said polyolefins are selected from the group consisting of such polyolefins in which the recurring alkylene unit comprises from about 2 to about 5 carbon atoms.

7. A composition according to claim 6 wherein said recurring alkylene unit comprises from about 2 to about 4 carbon atoms.

8. A composition according to claim 7 wherein said polyolefins are selected from the group consisting of polyethylene, polypropylene and polyisobutylene.

9. A composition according to claim 8 wherein said polyolefins are selected from the group consisting of polyethylene and polypropylene.

10. A composition according to claim 1 wherein said additive polymer is polyethylene.

11. A composition according to claim 1 wherein the viscosity (at 140° C., Brookfield) of said polymer is from about 200 cps to about 600 cps.

12. A composition according to claim 11 wherein said viscosity is from about 250 to about 550 cps.

13. A composition according to claim 12 wherein said viscosity is from about 250 to about 450 cps.

14. A composition according to claim 13 wherein said viscosity is from about 300 to about 450 cps.

15. A composition according to claim 14 wherein said viscosity is from about 350 to about 400 cps.

16. A composition according to claim 1 wherein the amount of said polymers is from about 15 to about 30 weight percent.

17. A composition according to claim 16 wherein said amount is from about 20 to about 30 weight percent.

18. A composition according to claim 16 wherein said amount is about 23 to about 27 weight percent.

19. A composition according to calim 1 wherein said fatty acid amides are selected from the group consisting of fatty acid amides having at least about 10 carbon atoms.

20. A composition according to claim 19 wherein said fatty acid amides are selected from the group consisting of those having at least about 11 carbon atoms.

21. A composition according to claim 20 wherein said fatty acid amides are selected from the group consisting of lauramide, myristamide, palmitamide, stearamide, oleamide, linoleamide and linolenamide.

22. A composition according to claim 21 wherein said compositon comprises oleamide.

23. A compostion according to claim 1 wherein the amount of said fatty acid amides is from about 2 to about 15 percent by weight based on the total weight of said fatty acid amides, polymers and inorganic materials.

24. A composition according to claim 1 wherein said amount of said fatty acid amides is from about 3 to about 12 percent by weight.

25. A composition according to claim 24 wherein said amount is from about 4 to about 10 percent by weight.

26. A composition according to claim 25 wherein said amount is about 4 to about 8 percent by weight.

27. A composition according to claim 1 wherein said finely divided organic materials are selected from the group consisting of talc, mica, and kaolin.

28. A composition according to claim 27 wherein said material is talc.

29. A composition according to claim 1 wherein the amount of said material is from about 50 to about 90 weight percent based on the total weight of the material, amides and additive polymer.

30. A composition according to claim 1 wherein the amount of said finely divided material is from about 50 to about 80 weight percent.

31. A composition according to claim 30 wherein said amount is from about 65 to about 75 weight percent.

32. A composition according to claim 1 wherein said effective amount is from about 0.15 to about 1 weight percent based on the total weight of said polyamide and said agent.

33. A composition according to claim 32 wherein said effective amount is from about 0.2 to about 0.6 weight percent.

34. A composition according to claim 33 wherein said effective amount is from about 0.25 to about 0.4 weight percent.

35. A composition comprising:
a polyamide having dispersed therein nucleating effective amount of a effective nucleating agent consisting essentially of:
(a) from about 5 to about 35 weight percent of one or more additive polymers of wax forming molecular weight selected from the group consisting of polyolefins, polyoxides and polysulfides;
(b) from about 2 to about 15 weight percent of one or ore fatty acids amides; and
(c) from about 50 to about 90 weight percent of one or more finely divided materials; wherein all weight percents are based on the total weight of the comination.

* * * * *